(12) United States Patent
Umemura et al.

(10) Patent No.: US 9,595,356 B2
(45) Date of Patent: Mar. 14, 2017

(54) NUCLEAR REACTOR OSCILLATION POWER RANGE MONITOR, AND METHOD AND PROGRAM THEREFOR

(75) Inventors: Norihiro Umemura, Fuchu (JP); Toshifumi Sato, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1344 days.

(21) Appl. No.: 13/111,322

(22) Filed: May 19, 2011

(65) Prior Publication Data

US 2011/0286566 A1 Nov. 24, 2011

(30) Foreign Application Priority Data

May 24, 2010 (JP) ................................ 2010-118539

(51) Int. Cl.
*G21C 17/108* (2006.01)
(52) U.S. Cl.
CPC .................. *G21C 17/108* (2013.01)
(58) Field of Classification Search
CPC .... G21C 17/10; G21C 17/102; G21C 17/108; Y02E 30/31
USPC ....... 376/254, 217, 258, 245, 359, 260, 259, 376/246; 326/27
See application file for complete search history.

(56) References Cited

U.S. PATENT DOCUMENTS 3,288,241 A * 11/1966 Bancroft et al. ................ 73/647
4,713,212 A * 12/1987 Plumier ........................ 376/258
4,770,843 A * 9/1988 Taleyarkhan .................. 376/216
5,085,824 A * 2/1992 Busch et al. .................. 376/268
5,174,946 A * 12/1992 Watford et al. ............... 376/216
(Continued)

FOREIGN PATENT DOCUMENTS

JP H03-274495 * 5/1991 ............. G21C 17/00
JP 03274495 A * 12/1991 ............. G21C 17/00
(Continued)

OTHER PUBLICATIONS

Lange et al. (Inlernational Conference on Mathemalics and Compu/ational Me/hods Applied /0 Nuclear Science and Engineering (M&C 2011)Rio de Janeiro, RJ, Braz il, May 8-12, 2011 , on CD-ROM, Latin American Section (LAS) / American Nuclear Society (ANS) ISBN 978-85-63688-00-2 Remarks to the Local Power Oscillation Phenomenon At BWRs).*

*Primary Examiner* — Jack W Keith
*Assistant Examiner* — Lily C Garner
(74) *Attorney, Agent, or Firm* — Oblon, McClelland, Maier & Neustadt, L.L.P.

(57) ABSTRACT

According to one embodiment, reactor oscillation power ranges monitor includes: a receiving unit which receives LPRM signals; an exclusion processing unit which searches the LPRM signals allocated to the cell for an LPRM signal corresponding to an exceptional condition; an averaging unit which averages the allocated LPRM signals; a time averaging unit which calculates a time average of the average flux value; a normalized value calculation unit which divides the average flux value by the time averaged flux value; an initialization unit which outputs an initialization signal identifying the cell allocated to an LPRM signal which is changed to correspond or not correspond to the exceptional condition; and a determination unit which derives at least one of amplitude and cycle of a power oscillation from the normalized value.

6 Claims, 6 Drawing Sheets

(56) References Cited

U.S. PATENT DOCUMENTS

| | | | |
|---|---|---|---|
| 5,369,676 A * | 11/1994 | Ortega et al. | 376/271 |
| 5,481,575 A * | 1/1996 | Back et al. | 376/254 |
| 5,490,185 A * | 2/1996 | Dent et al. | 376/268 |
| 5,557,612 A * | 9/1996 | Bingham | 370/449 |
| 5,644,607 A * | 7/1997 | Iwama et al. | 376/268 |
| 7,269,463 B2 * | 9/2007 | Nagatsuka et al. | 700/17 |
| 7,646,990 B2 * | 1/2010 | Weber et al. | 398/197 |
| 2008/0159463 A1 * | 7/2008 | Ortega et al. | 376/269 |
| 2010/0065750 A1 * | 3/2010 | Kumanomido | G21C 17/063 250/389 |
| 2010/0254504 A1 * | 10/2010 | Sakai et al. | 376/254 |

FOREIGN PATENT DOCUMENTS

| | | | | |
|---|---|---|---|---|
| JP | H04 118591 | * | 4/1992 | G21C 7/08 |
| JP | H04118591 | * | 4/1992 | G21C 7/08 |
| JP | HO4 118591 | * | 4/1992 | G21C 7/08 |
| JP | H04 335197 | * | 11/1992 | G21C 17/10 |
| JP | H07 280984 | * | 10/1995 | G21C 17/108 |
| JP | 2002-014188 | * | 1/2002 | G21C 17/00 |
| JP | 2002 014188 | * | 1/2002 | G01T 3/00 |
| JP | 2004-354166 | * | 12/2004 | G21C 17/10 |
| JP | 2006 133193 | * | 5/2006 | G21C 17/00 |
| JP | 2006133193 | * | 5/2006 | G21C 17/00 |
| JP | 2007057355 | * | 3/2007 | G21C 17/10 |
| JP | 2011-247643 | * | 12/2011 | G21C 17/00 |

* cited by examiner

NUCLEAR REACTOR OSCILLATION POWER RANGE MONITOR, AND METHOD AND PROGRAM THEREFOR

CROSS-REFERENCE TO RELATED APPLICATIONS

This application is based upon and claims the benefit of priority from Japanese Patient application No. 2010-118539, filed on May 24, 2010, the entire contents of each of which are incorporated herein by reference.

FIELD

Embodiments described herein relate generally to a technique for monitoring power oscillations in a reactor.

BACKGROUND

Boiling water reactors (BWR) have measures to reduce reactor power by scramming the reactor before fuel integrity is damaged. As one of the measures to do this, an oscillation power range monitor (OPRM) for detecting neutron flux oscillations caused by nuclear thermal hydraulic instabilities is used to evaluate reactor core stability (for example, see Japanese Patent No. 3064084).

For example, an advanced BWR (ABWR) has 208 local power range monitor detectors (LPRM detectors) disposed in the reactor core to detect neutron fluxes. These LPRM detectors are grouped into pairs of 4 LPRM detectors and each pair is housed in an instrument tube arranged in the vertical direction, resulting in a total of 52 instrument tubes being disposed in the reactor core.

The ABWR has four oscillation power range monitors. Each oscillation power range monitor is configured to receive neutron flux signals (LPRM signals) from the 52 LPRM detectors of the total of 208 LPRM detectors.

Each LPRM signal contains oscillations caused by noise components other than oscillations caused by nuclear thermal hydraulic instabilities, and thus undergoes filtering to remove the noise components.

The filtered plurality of LPRM signals (filtered flux values) are allocated to a predetermined cell so as to maintain redundancy, and the average flux values averaged for each cell are calculated. Note that an ABWR has 44 cells.

The time averaged flux value is derived by executing time averaging process using a filter with a relatively long time constant on the average flux value. Further, the average flux value is divided by the time averaged flux value to calculate a normalized value with only the oscillation components of the LPRM signal extracted.

Then, the oscillation power range monitor derives the amplitude and the cycle of an oscillating waveform by detecting crest and trough peaks of an oscillating waveform of the normalized value and monitors power oscillations caused by nuclear thermal hydraulic instabilities based on various algorithms. Thus, when a determination is made that fuel integrity may be damaged, a scram signal is generated.

In addition, the OPRM receives an average value (APRM value) of the LPRM signals of the 52 LPRM detectors and a reactor core flow value (FLOW), and determines whether or not the reactor is in an operation area having a possibility that the reactor may generate power oscillations. When a determination is made that the reactor is in the operation area having no possibility that the reactor may generate power oscillations, the OPRM stops the power oscillation monitoring algorithm in order to prevent the scram signal from being generated due to an incorrect determination.

The aforementioned normalized value calculation in the OPRM includes a calculation of the normalized value from the remaining LPRM signals allocated to each cell except the LPRM signals corresponding to the following exceptional conditions (1) to (3).

(1) The generating LPRM detector is in a failure state. (2) An error occurs in the transmission path of the LPRM signal in a preceding stage of the OPRM. (3) The LPRM signal value is smaller (for example, less than 5%) than a preset value.

Note that there may be a case in which during the normalized value calculation, any one of the LPRM signal changed to correspond to exceptional conditions or any one of the LPRM signal changed to not correspond to exceptional conditions. If that happens, the LPRM signals subjected to the normalized value calculation may be removed from or returned to the calculation during the calculation. Therefore, the average flux values change in a discontinuous manner and the accordingly calculated normalized values change in an abnormal manner (see FIG. 4A). Thus, unfortunately, incorrect crest and trough peaks may be detected from the oscillating waveform of the obtained normalized value, leading to an incorrect determination in the power oscillation monitoring.

In addition, when the oscillation power range monitor returns to normal operating state from a state different from the normal operating state such as a bypass, a failure state and a test mode, the same case as the aforementioned case may be assumed to occur. For example, in a test mode, the normalized value calculated at the time when the calculation target is changed from a simulation signal generated outside or inside to an LPRM signal may be discontinuous, leading to an incorrect determination in the power oscillation monitoring.

In view of the above circumstances, the present invention has been made, and an object of the embodiments described herein are to provide a highly reliable reactor power oscillation monitoring technique for suppressing a discontinuous change in extracted oscillation components when an averaging process is performed on a plurality of LPRM signals the number of which to be calculated may be changed.

BRIEF DESCRIPTION OF THE DRAWINGS

FIG. 4A and FIG. 4B are an explanatory graph of effects of the oscillation power range monitor according to the first embodiment of the present invention.

DETAILED DESCRIPTION

First Embodiment

Now, a first embodiment of the present invention will be described based on the accompanying drawings.

Figure 1:
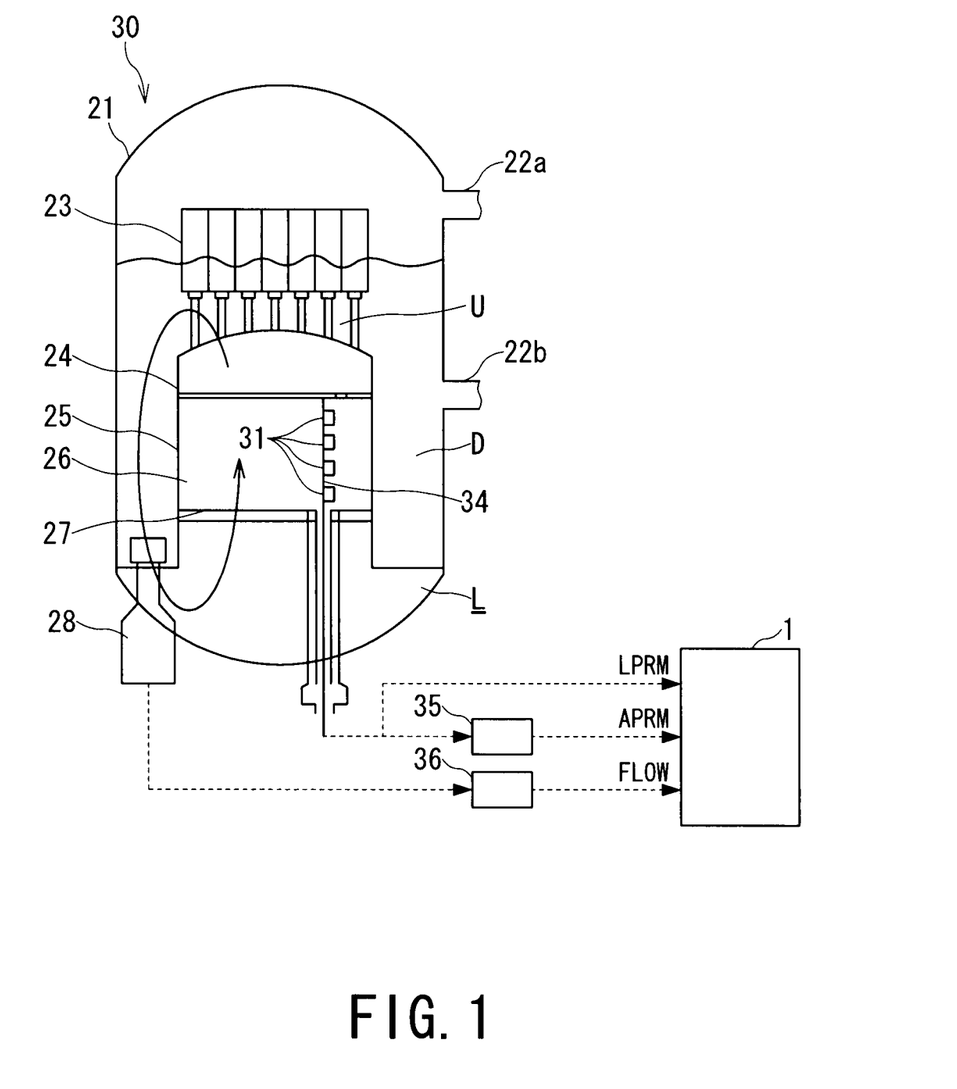
FIG. 1 is a longitudinal sectional view illustrating a reactor applying to the present invention.

As illustrated in FIG. 1, a reactor 30 includes a pressure vessel 21 which houses a reactor core 26; a main steam pipe 22a which guides steam generated in the reactor core 26 to a turbine (unillustrated) in which the steam works and expands and subsequently is cooled and condensed to water; and a water supply pipe 22b which returns the water back to the pressure vessel 21.

The outer periphery of the reactor core 26 is surrounded by a shroud 25 fixed to within the pressure vessel 21; the lower portion thereof is supported by a reactor core support plate 27 fixed to the shroud 25; and the upper portion thereof is supported by an upper grid plate 24.

The steam generated in the reactor core 26 is separated into steam and water in a steam-water separator 23. As described above, the steam is guided to the main steam pipe 22a and contributes to power generation, and the separated water is joined to the water returned from the water supply pipe 22b. The reactor water joined in this manner goes down through a region (downcomer D) formed by the shroud 25 and the pressure vessel 21 and guided to a lower plenum L by a plurality of recirculation pumps 28 disposed in a peripheral direction (only one recirculation pump is illustrated in the figure).

The reactor water guided to the lower plenum L passes through the reactor core 26 again to be heated into a gas-liquid two-phase flow which reaches an upper plenum U. The reached gas-liquid two-phase flow is guided again to the steam-water separator 23 in which the aforementioned process is repeated.

Figure 2:
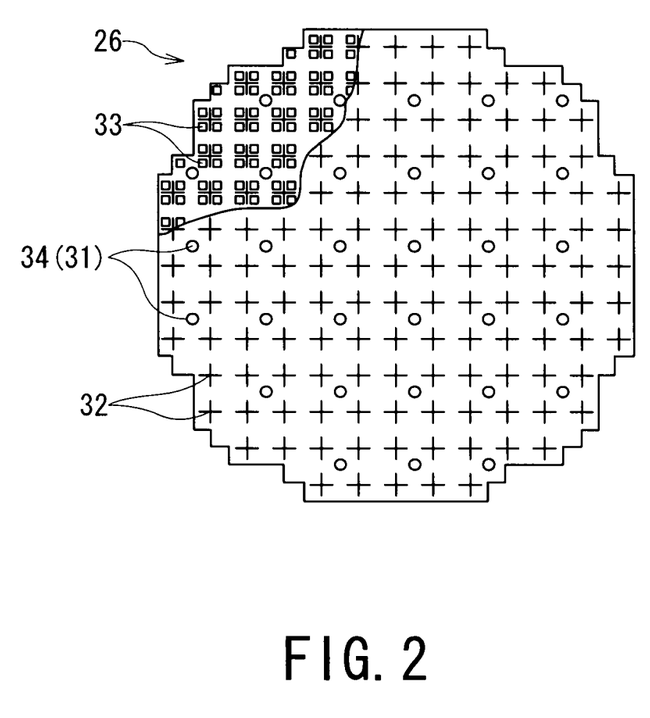
FIG. 2 is a horizontal sectional view illustrating the reactor applying to the present invention.

As the horizontal sectional view is illustrated in FIG. 2, the reactor core 26 has an array of a large number of fuel assemblies 33, each of which has a rectangular tubular channel box each housing a large number of fuel rods (unillustrated); control rods 32 each of which absorbs neutrons emitted in a nuclear fission reaction and controls power; and instrument tubes 34, each of which supports the LPRM detectors 31 (FIG. 1) detecting the neutrons and the upper and lower ends of which are fixed to the upper grid plate 24 and the reactor core support plate 27.

The instrument tubes 34 are provided about one for each of the 16 fuel assemblies 33. For example, when the ABWR has 872 fuel assemblies 33, 52 instrument tubes 34 are provided (note that the number does not match the number in the figure). The LPRM signals outputted from each of the plurality of LPRM detectors 31 are grouped into several groups which are outputted to an average power range monitor 35 (APRM) illustrated in FIG. 1.

The average power range monitor 35 averages LPRM signals for each group and outputs an APRM signal indicating the reactor power.

The reactor core flow deriving unit 36 feeds signals from the recirculation pump 28 and other devices and outputs a reactor core flow signal (FLOW) indicating the amount of reactor water flowing through the reactor core 26.

Figure 3:
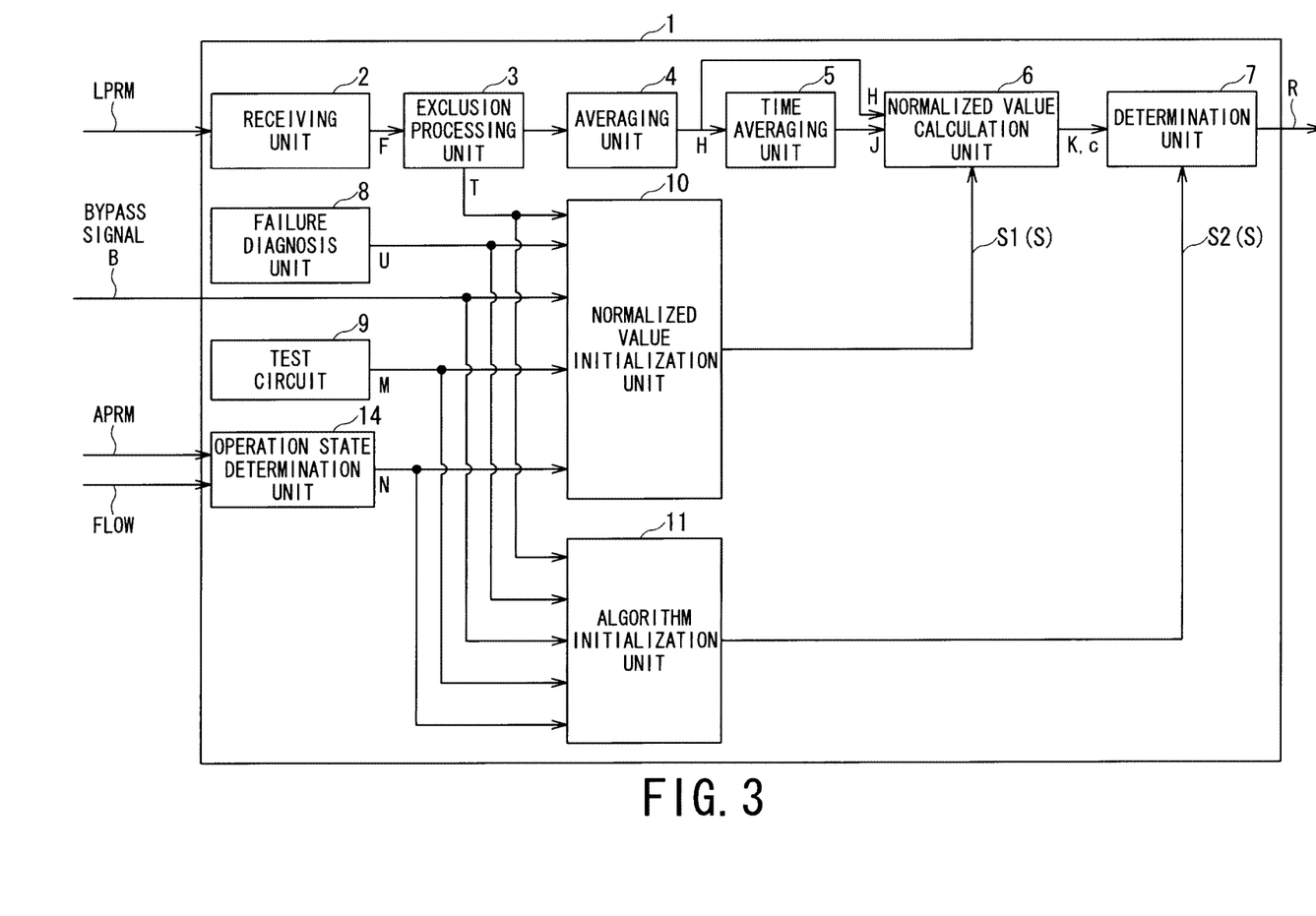
FIG. 3 is a block diagram illustrating a first embodiment of a reactor oscillation power range monitor according to the present invention.

As illustrated in FIG. 3 (see FIG. 1 as needed), the oscillation power range monitor 1 includes a receiving unit 2 which receives the LPRM signals generated from a plurality of LPRM detectors 31 provided in the reactor core 26 by allocating each of the LPRM signals to a specified cell; an exclusion processing unit 3 which searches the LPRM signals allocated to the specified cell for an LPRM signal corresponding to an exceptional condition; an averaging unit 4 which averages the allocated LPRM signals for each specified cell by excluding the LPRM signals corresponding to the exceptional condition and outputs an average flux value H; a time averaging unit 5 which calculates the time average of the average flux value H and outputs a time averaged flux value J; a normalized value calculation unit 6 which divides the average flux value H by the time averaged flux value J and outputs a normalized value K; a normalized value initialization unit 10 and an algorithm initialization unit 11, each of which outputs an initialization signal S identifying the cell allocated to an LPRM signal which is changed to correspond or not correspond to the exceptional condition; and a determination unit 7 which derives the amplitude and/or the cycle of a power oscillation from the normalized value K and performs determination based on a predetermined algorithm.

The cell is a concept of classifying the LPRM detectors 31 distributed over the entire reactor core 26 into several groups in a regular manner. The LPRM detectors 31 allocated to each cell are partially overlapped between the cells so as to be redundant enough to surely detect neutron flux oscillations caused by nuclear thermal hydraulic instabilities.

For example, the ABWR has 44 cells and adjacent cells use the same LPRM signals for calculation.

The LPRM signals received by the receiving unit 2 are converted to digital signals by an A/D conversion unit (unillustrated) at the preceding stage. Further, the LPRM signals contain noise components other than the oscillation components caused by nuclear thermal hydraulic instabilities, and thus the noise components are removed by a filter (unillustrated). As the filter, for example, a filter with a cutoff frequency of 1 Hz is used. The filtered LPRM signal (filtered flux value F) is then transmitted to the exclusion processing unit 3.

Each filtered flux value F received by the exclusion processing unit 3 is determined as to whether or not it is suitable for power oscillation monitoring. The filtered flux values F corresponding to any one of the following exceptional conditions (1) to (4) are determined to be unsuitable and removed. Then, the remaining flux values F are transmitted to the averaging unit 4.

(1) The generating LPRM detector 31 (FIG. 1) is determined to be failed by a preceding-stage unit (unillustrated). (2) The generating LPRM detector 31 is bypassed due to a failure. (3) A transmission error occurs in a transmission path between the generating LPRM detector 31 and the preceding-stage unit. (4) The LPRM signal of the generating LPRM detector 31 has a smaller value than a preset value.

Further, when a change occurs in the object of a filtered flux value F (LPRM signal) to be subjected to the exclusion processing, the exclusion processing unit 3 transmits a change notification signal T to the normalized value initialization unit 10 and the algorithm initialization unit 11.

Of the filtered flux values F allocated to each preset cell, the averaging unit 4 averages the filtered flux values F which are not excluded by the exclusion processing unit 3 for each cell to calculate an average flux value H. Then, the calculated average flux value H is transmitted to the time averaging unit 5 and the normalized value calculation unit 6.

The time averaging unit 5 temporarily accumulates a plurality of average flux values H which have been received by tracing back to the past for a certain period of time from the time when the most recent average flux value H is received. Then the accumulated plurality of average flux values H are averaged to calculate a time averaged flux value J. Thus, the calculated time averaged flux value J becomes a signal from which the oscillation components deriving from power oscillations are removed (smoothed).

Note that the above described method of calculating the time averaged flux value J is just an example and other commonly used time averaging methods may be used as needed.

The normalized value K calculated by the normalized value calculation unit 6 is a signal obtained by dividing the received average flux value H by the time averaged flux value J. Thus, the normalized value K reflects the oscillation components deriving from power oscillations and becomes a signal in which the central value of the oscillations is normalizezed to 1.

Meanwhile, as described above, the time averaged flux value J used to calculate the normalized value K reflects information on the average flux values H that have been received for certain period of time. When a change occurs in the object of a filtered flux value F (LPRM signal) to be subjected to the exclusion processing by the exclusion processing unit 3, the average flux value H may change as illustrated by the dotted lines X in FIG. 4 such that the calculated values are discontinuously changed before and after the change.

Figure 4A:
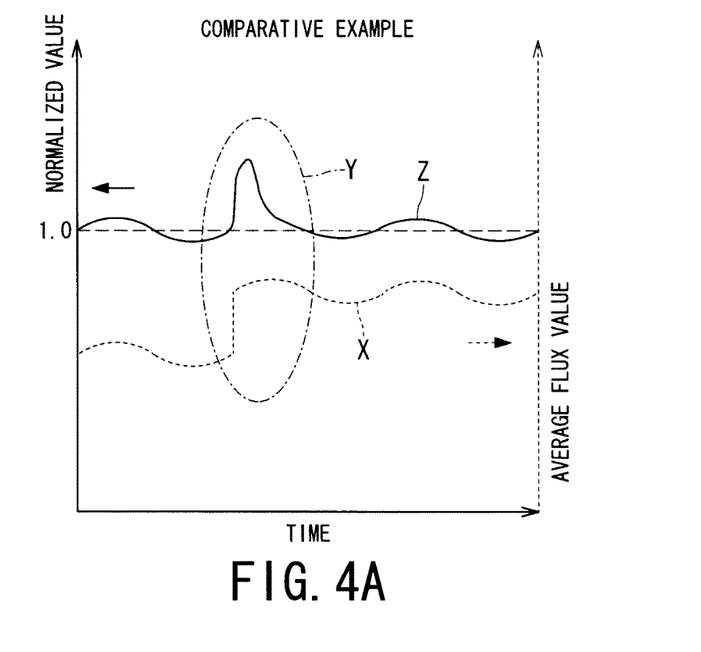
FIG. 4A is a graph illustrating a comparative example and FIG. 4B is a graph illustrating a working example.

Assume that an average flux value H calculated after a change occurred in the object of a filtered flux value F to be subjected to the exclusion processing is divided by a time averaged flux value J containing information on an average flux value H before the change. Then, an abnormal change occurs in the normalized value K indicated by the solid line Z and enclosed by the dashed-dotted line Y in FIG. 4A illustrated as a comparative example.

Figure 4B:
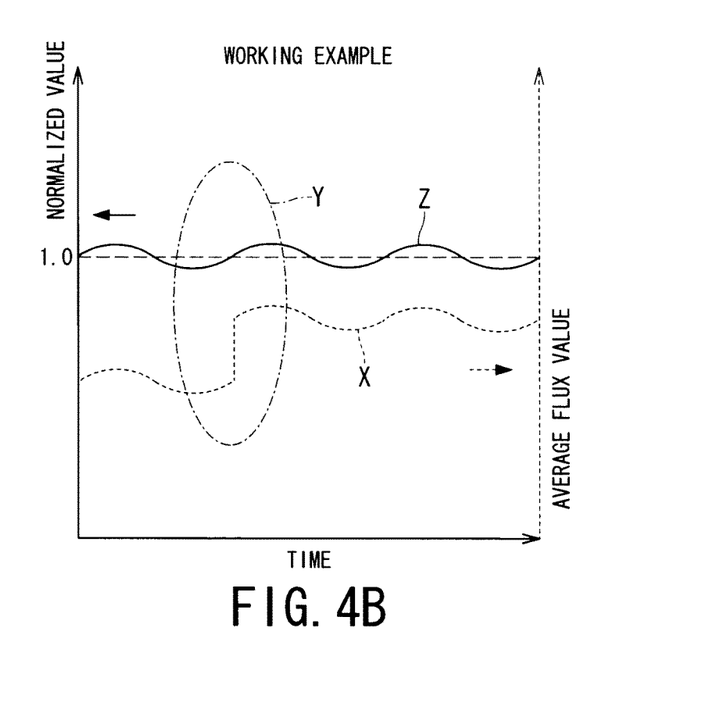

In light of this, when the change notification signal T is received from the exclusion processing unit 3, the normalized value initialization unit 10 outputs an initialization signal S1 to suppress the abnormal change in the normalized value K as indicated by the solid line Z in FIG. 4B.

The abnormal change is sufficiently suppressed not to exceed the amplitude of a true normalized value K. Thus, in response to the initialization signal S1, the normalized value calculation unit 6 outputs a constant c instead of the normalized value K.

As the constant c, a value of the same as or close to the oscillation center (=1) is adopted so as to minimize the power oscillation displacement. The constant c continues to be outputted until at least all the LPRM signals (filtered flux values F) to be subjected to calculation of the normalized value K (time averaged flux value J) become the same.

Note that when the constant c=1 is adopted, in response to the initialization signal S1, the normalized value calculation unit 6 may receive two signals which are either one of the average flux value H and the time averaged flux value J to cause the same values to be mutually divided.

The normalized value K and the constant c calculated by the normalized value calculation unit 6 in this manner are transmitted to the determination unit 7.

The determination unit 7 calculates the amplitude and the cycle of the oscillation from the maximum value (crest peak) and the minimum value (trough peak) calculated from a time-series signal of the received normalized value K and constant c.

The determination unit 7 has a threshold for evaluating the calculated amplitude and/or cycle. Based on a predetermined algorithm, the determination unit 7 detects power oscillations caused by nuclear thermal hydraulic instabilities from the amplitude and/or cycle, and outputs a scram signal R.

Here, the algorithm is provided to prevent the scram signal R from being incorrectly outputted based on an error signal in such a manner that the scram signal R is not outputted when the calculated amplitude and/or cycle exceeds the threshold even once, but the scram signal R is outputted only when the calculated amplitude and/or cycle exceeds the threshold a specified number of times in succession.

When the change notification signal T is received from the exclusion processing unit 3, the algorithm initialization unit 11 outputs the initialization signal S2 to the determination unit 7 and initializes the algorithm in response to the initialization signal. Thus, when a change occurred in the object of a filtered flux value F to be subjected to the exclusion processing, the detection sequence of power oscillations caused by nuclear thermal hydraulic instabilities is executed again from the beginning.

As described above, the normalized value initialization unit 10 and the algorithm initialization unit 11 transmit the initialization signals S (S1 and S2) to the normalized value calculation unit 6 and the determination unit 7 respectively.

The information triggering a transmission of the initialization signals S (S1 and S2) includes not only the aforementioned change notification signal T from the exclusion processing unit 3, but also a failure information signal U from a failure diagnosis unit 8, a bypass signal B from outside, a test mode signal M from a test circuit 9, an operation information signal N from an operation state determination unit 14, and the like.

Here, the operation state determination unit 14 outputs an operation information signal N depending on whether the current state of the reactor 30 (FIG. 1) is in a low flow state and a high power state or in the other states in a characteristic curve indicating the relation between the reactor core flow (FLOW) and the reactor power (APRM). This is because when the state of the reactor 30 is in a low flow state and a high power state, neutron flux oscillations caused by nuclear thermal hydraulic instabilities occur very frequently.

The normalized value initialization unit 10 identifies the cell satisfying at least one of the following conditions and transmits the initialization signal S1 for initializing the normalized value K (to the constant c) together with information capable of identifying the corresponding cell to the normalized value calculation unit 6.

(1) The change notification signal T indicating a change in the object of a filtered flux value F to be subjected to the exclusion processing by the exclusion processing unit 3 is transmitted. (2) A cell bypass signal is changed from a bypass state to a non-bypass state. (3) The failure information signal U from the failure diagnosis unit 8 is changed from a failure to a non-failure state. (4) The bypass signal B from outside is changed from a bypass state to a non-bypass state. (5) The test mode signal from the test circuit 9 is changed from a test state to a non-test state. (6) The operation information signal N from the operation state determination unit 14 is changed from a bypass state to a non-bypass state.

Of the above conditions, the conditions (3) to (6) are a change affecting not only a specific cell but also all cells, and thus all cells subjected to calculation by the oscillation power range monitor 1 are initialized.

The algorithm initialization unit 11 identifies the cell satisfying one of the following conditions and transmits the initialization signal S2 for initializing the algorithm together with information capable of identifying the corresponding cell to the determination unit 7.

(1) The change notification signal T indicating a change in the object of a filtered flux value F to be subjected to the exclusion processing by the exclusion processing unit 3 is transmitted. (2) The cell bypass signal is in the bypass state. (3) The failure information signal U from the failure diagnosis unit 8 is changed from the failure state to the non-failure state. (4) The bypass signal B from outside is changed from the bypass state to the non-bypass state. (5) The test mode signal from the test circuit 9 is changed from the test state to the non-test state. (6) The operation information signal N from the operation state determination unit 14 is in the bypass state.

As described above, according to the reactor oscillation power range monitor 1 of the present embodiment, the normalized value K calculated by the normalized value calculation unit 6 is set to a value (constant c) close to 1, which is the central value, when the object subjected to the calculation is changed. Further, when a change occurs in the monitoring state, the determination unit 7 initializes each algorithm sequence before determination. Thus, the present embodiment can provide an oscillation power range monitor which reduces an incorrect determination in evaluating reactor core stability.

Second Embodiment

Figure 5:
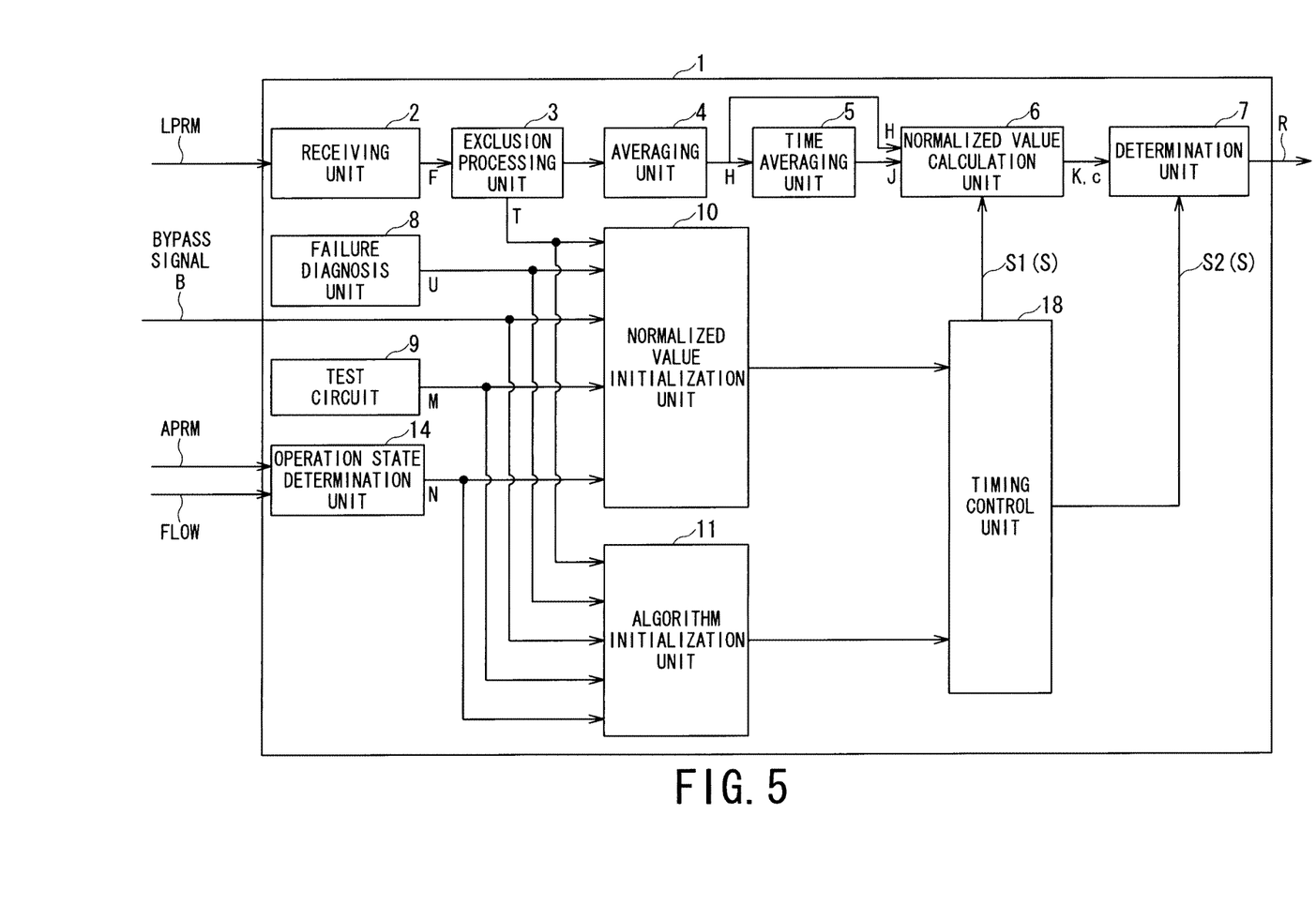
FIG. 5 is a block diagram illustrating a second embodiment of the reactor oscillation power range monitor according to the present invention.

Now, by referring to FIG. 5, the oscillation power range monitor 1 according to a second embodiment will be described. Note that In FIG. 5, the same reference numerals or characters are assigned to the components which are the same as or similar to those in FIG. 3 and the detailed description is omitted by incorporating the above description by reference.

The oscillation power range monitor 1 according to the second embodiment adds a timing control unit 18 to the following stage of the normalized value initialization unit 10 and the algorithm initialization unit 11.

During a period in which the constant c continues to be outputted from the normalized value calculation unit 6, the timing control unit 18 causes the determination unit 7 to initialize the algorithm. Further, the timing control unit 18 can set the period in which the constant c continues to be outputted from the normalized value calculation unit 6.

Of the aforementioned conditions for transmitting the initialization signals S (S1 and S2), the condition in which the initialization signal S1 and the initialization signal S2 occur at the same time will be considered.

For example, the condition (1) is common to both the initialization signals S (S1 and S2). When this condition is established, the algorithm initialization is performed at the same timing of the initialization of the normalized value K (consider constant c=1).

Accordingly, depending on the state of the LPRM signal, the algorithm sequence may not always start with the normalized value K=1.

Here, assume that the timing control unit 18 receives the initialization signal S1 from the normalized value initialization unit 10 and the initialization signal S2 from the algorithm initialization unit 11 at the same time. In this case, the timing control unit 18 extends the period of occurrence of the initialization signal S1, and releases the occurrence of the initialization signal S1 after the determination unit 7 receives the initialization signal S2, completes the algorithm initialization, and starts monitoring.

Accordingly, the determination unit 7 can always monitor the change from the state of normalized value=1 to be subjected to monitoring even if a change occurs in the state.

Thus, the present embodiment can provide an oscillation power range monitor which reduces an incorrect determination in evaluating reactor core stability.

Figure 6:
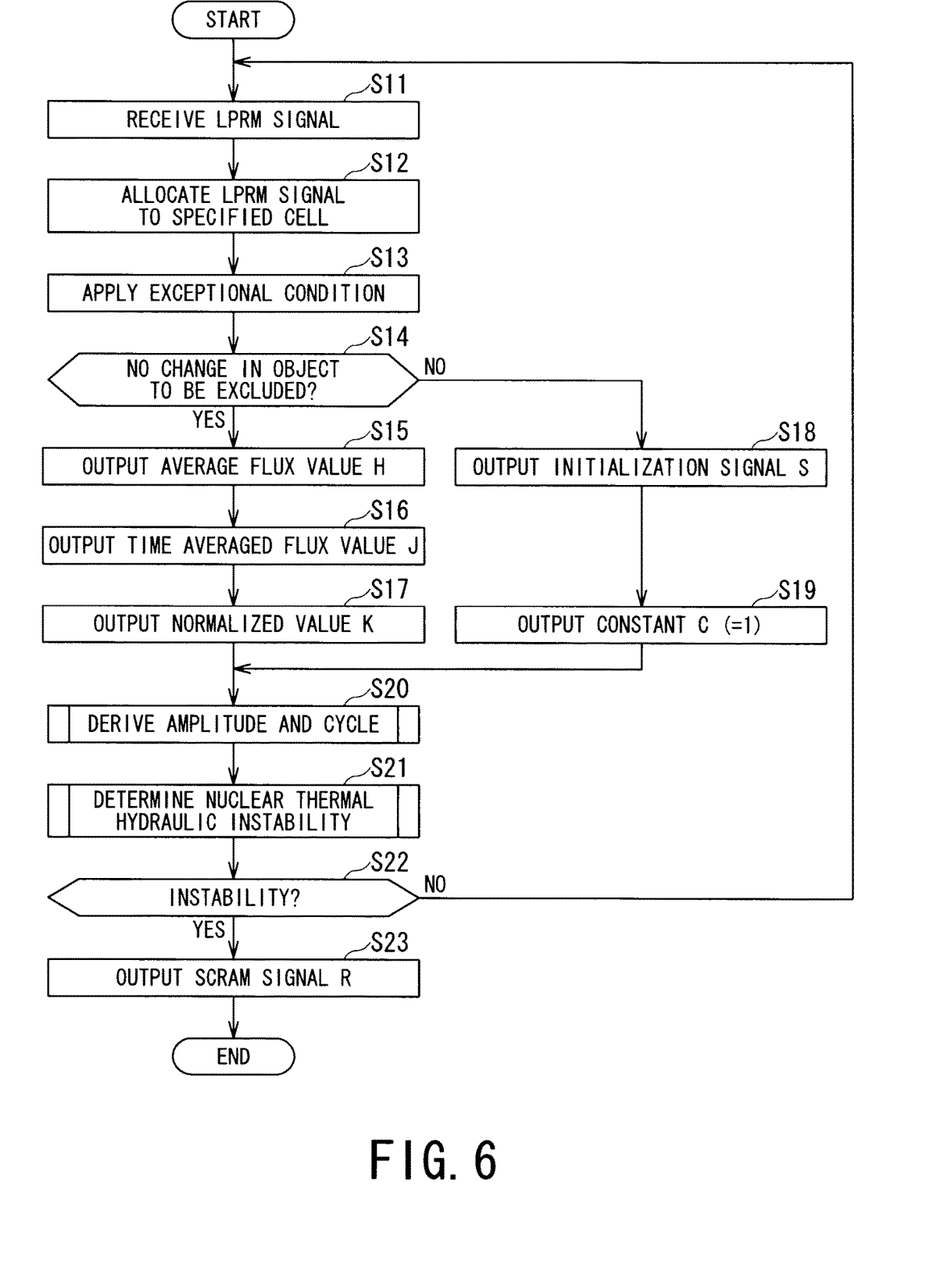
FIG. 6 is a flowchart illustrating an operation of the reactor oscillation power range monitor according to the second embodiment of the present invention.

Now, by referring to FIG. 6 (see also FIG. 1 as needed), the operation of the reactor oscillation power range monitor 1 will be described.

First, the reactor oscillation power range monitor 1 receives each of the LPRM signals generated from a plurality of LPRM detectors 31 disposed in the reactor core 26 (S11), and then allocates the received LPRM signals to a specified cell (S12).

Then, the reactor oscillation power range monitor 1 applies an exceptional condition to the LPRM signals allocated to a specified cell to search for an LPRM signal corresponding to the exceptional condition (S13). If there is no change in the LPRM signal corresponding to the exceptional condition (S14: Yes), the LPRM signals allocated by excluding the LPRM signals corresponding to the exceptional conditions are averaged for each cell and the average flux value H is outputted (S15).

Then, the time average of the average flux value H is calculated to output the time averaged flux value J (S16). Then, the average flux value H is divided by the time averaged flux value J to output the normalized value K (S17).

Meanwhile, if there is a change in the LPRM signal corresponding to the exceptional condition (S14: No), the initialization signal S identifying the cell allocated to the LPRM signal in which a change occurs is outputted (S18). Then, instead of the normalized value K, the constant c (=1) is outputted (S19).

Then, the amplitude and/or the cycle of a power oscillation are derived from the normalized value K (S20), and a determination of nuclear thermal hydraulic instability is executed based on a predetermined algorithm (S21).

Here, if instability is determined (S22: Yes), the scram signal R is outputted (S23); and if stability is determined (S22: No), the aforementioned flow from S11 to S21 is repeated.

The present invention is not limited to the above described embodiments, but can be practiced by appropriately modify the embodiments within the scope of common technical ideas.

For example, each functional unit of the oscillation power range monitor can also be implemented by a computer program.

Further, the above embodiment describes that the normalized value calculation unit 6 receives the initialization signal S and outputs the constant c (=1) instead of the normalized value K, but the value to be outputted instead of the normalized value K is not limited to the constant c as long as the value can avoid an incorrect determination by the determination unit 7.

While certain embodiments have been described, these embodiments have been presented by way of example only, and are not intended to limit the scope of the inventions. Indeed, the technique for monitoring power oscillations in a reactor described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A reactor oscillation power range monitor comprising:
a receiving unit which receives local power range monitor (LPRM) signals generated from a plurality of LPRM detectors provided in a reactor core, the LPRM detectors distributed over the entire reactor core into several groups in a regular manner, each group classified as a cell and each of the LPRM signals allocated to a specified cell;
an exclusion processing unit which searches the LPRM signals allocated to each cell for an LPRM signal corresponding to an exceptional condition, wherein the exceptional condition determines a LPRM signal unsuitable for a power oscillation monitoring;
an averaging unit which averages the allocated LPRM signals for each of the cells by excluding the LPRM signals corresponding to the exceptional condition and outputs an average flux value;
a time averaging unit which calculates a time average of the average flux value and outputs a time averaged flux value;
a normalized value calculation unit which divides the average flux value by the time averaged flux value and outputs a normalized value;
an initialization unit which outputs an initialization signal when a value of an LPRM signal changes to correspond or not correspond to the exceptional condition, the initialization signal identifying the cell allocated to the LPRM signal;
a determination unit which derives at least one of amplitude and cycle of the power oscillation from the normalized value and performs determination of nuclear thermal hydraulic instability based on a predetermined algorithm; and
in response to the initialization signal, the normalized value calculation unit outputs a constant value instead of the normalized value of the cell identified by the initialization signal.

2. The reactor oscillation power range monitor according to claim 1, wherein the determination unit is configured to initialize the predetermined algorithm in response to the initialization signal.

3. The reactor oscillation power range monitor according to claim 1, wherein the normalized value calculation unit is configured to continue outputting the constant outputted in response to the initialization signal until at least all LPRM signals subjected to calculation of the normalized value become the same.

4. The reactor oscillation power range monitor according to claim 1, further comprising a timing control unit which causes the determination unit to initialize the algorithm during a period in which the constant continues to be outputted from the normalized value calculation unit.

5. The reactor oscillation power range monitor according to claim 4, wherein
the timing control unit sets the period in which the constant continues to be outputted from the normalized value calculation unit.

6. A reactor power oscillation monitoring method comprising the steps of:
receiving local power range monitor (LPRM) signals generated from a plurality of LPRM detectors provided in a reactor core, the LPRM detectors distributed over the entire reactor core into several groups in a regular manner, each group classified as a cell and each of the LPRM signals allocated to a specified cell;
searching the LPRM signals allocated to each cell for an LPRM signal corresponding to an exceptional condition;
outputting an average flux value by averaging the allocated LPRM signals for each of the cells by excluding the LPRM signals corresponding to the exceptional condition, wherein the exceptional condition determines a LPRM signal unsuitable for a power oscillation monitoring;
outputting a time averaged flux value by calculating a time average of the average flux value;
outputting a normalized value by dividing the average flux value by the time averaged flux value;
outputting an initialization signal identifying the cell allocated to an LPRM signal having a value which changes to correspond or not correspond to the exceptional condition; and
performing determination based on a predetermined algorithm by deriving at least one of amplitude and cycle of the power oscillation from the normalized value of nuclear thermal hydraulic instability.

* * * * *